(No Model.)

T. C. BEAUMONT.
PERIODICAL FLUSHING TANK.

No. 475,533. Patented May 24, 1892.

WITNESSES:
John Becker
Fred White

INVENTOR:
Thomas C. Beaumont,
By his Attorneys,
Arthur G. Fraser & Co.

UNITED STATES PATENT OFFICE.

THOMAS C. BEAUMONT, OF NEW YORK, N. Y., ASSIGNOR TO THE HENRY HUBER COMPANY, OF SAME PLACE.

PERIODICAL FLUSHING-TANK.

SPECIFICATION forming part of Letters Patent No. 475,533, dated May 24, 1892.

Application filed February 18, 1892. Serial No. 421,956. (No model.)

*To all whom it may concern:*

Be it known that I, THOMAS C. BEAUMONT, a citizen of the United States, residing in the city, county, and State of New York, have invented certain new and useful Improvements in Periodical Flushing-Tanks, of which the following is a specification.

This invention relates to tanks for giving a flush of water at regularly-recurrent intervals. Such tanks are commonly used with urinals.

My improved tank flushes through a siphon at intervals and has improved means for starting the siphon for emptying the tank whenever the latter has been filled from the source of supply.

Figure 1:
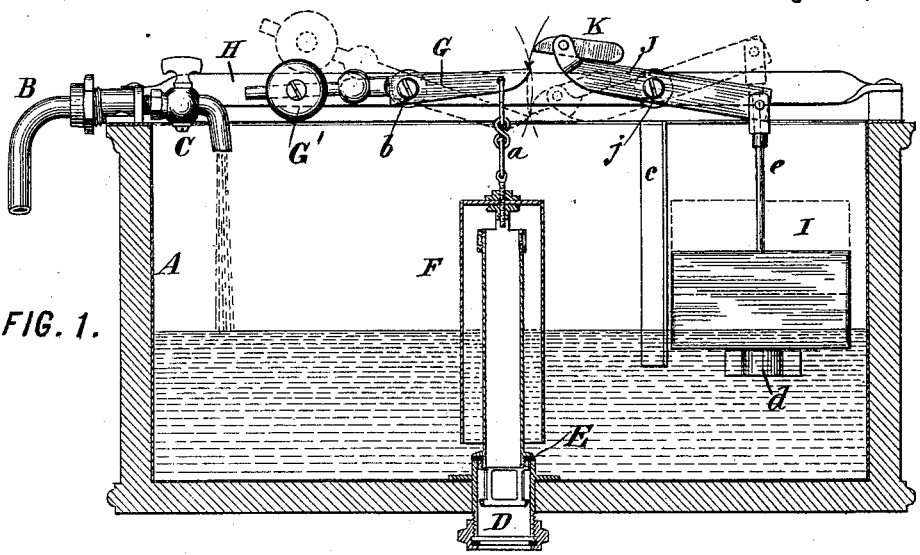
Figure 2:
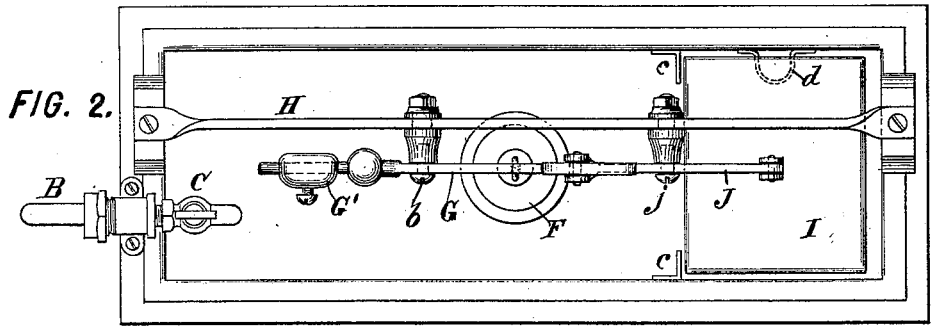
Figure 3:
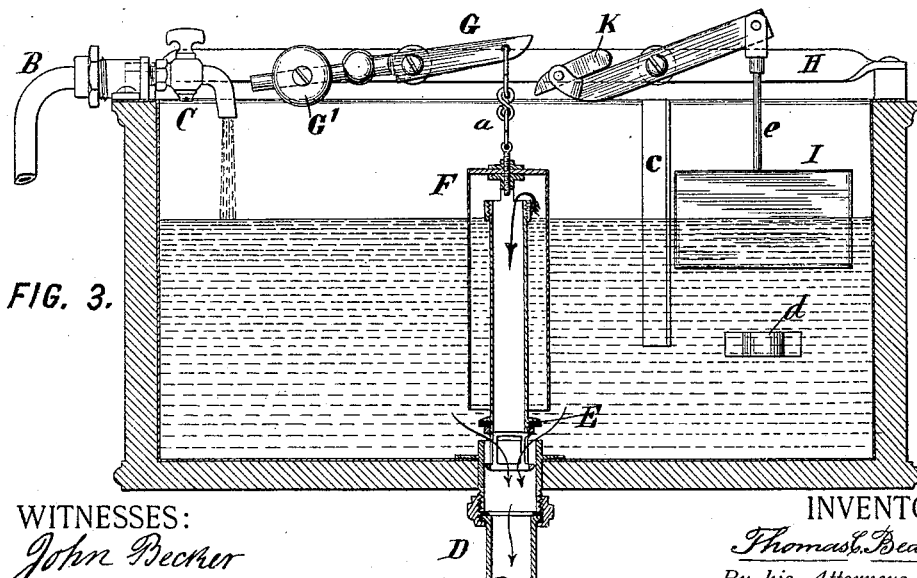

Figure 1 of the accompanying drawings is a vertical longitudinal section of my improved tank, showing it at rest and while being filled with water. Fig. 2 is a plan thereof. Fig. 3 shows the tank at the instant of starting the siphon.

Let A designate any suitably-constructed tank having a service-pipe B for admitting water to it through a cock C by the adjustment of which the stream of water may be graduated. From the bottom of the tank is an outlet D, from which a flushing-pipe leads to the urinal or other device to be flushed. This outlet D is normally closed by a valve E. In communication with this valve is a siphon F, which may be constructed as a gooseneck, but is preferably of the concentric pattern, as shown, the inner tube forming the stem of the valve E and the outer tube being closed at its top to form a bell and fastened to the inner tube. The siphon is connected by a chain or other loose connection $a$ to a lifting-lever G, which is fulcrumed at $b$ on a screw or stud fixed on a cross-bar H or otherwise suitably supported. The lever G has on its opposite arm a counter-weight G', the weight of which is insufficient to uphold the weight of the parts F and E when the tank is empty, but which is sufficient to uphold them when they are suspended in water when the tank is full.

A float I is arranged to move up and down within the tank, being guided in any suitable manner—as, for example, by guiding-strips $c$ $c$—and with any suitable means, as a stop $d$, for limiting its downward movement. This float is connected by a push-rod $e$ or otherwise to a lever J, which is pivoted at $j$ to a stud on the frame H. This lever J carries on its opposite arm a pivoted pawl K, the nose of which is adapted in the downward movement of the pawl to strike the end of the lever G, as shown by the arrow in Fig. 1, and carry it down, also, until a point is reached at which it slips off the end of the lever G, as shown in dotted lines in Fig. 1. The pawl K is counterweighted so that it tends to retain a position relatively to the lever J, which is shown in Fig. 1.

The operation is as follows: Water being admitted to the tank from the faucet C, the tank gradually fills, as shown in Fig. 1, until with the rise of the water it lifts the float I and carries the latter up as the water-level rises. As the float rises it tilts the lever J, causing its pawl K to sweep slowly downward. In this movement its nose strikes the end of the lever G and carries this lever down with it until the pawl frees itself from the lever in the position shown in dotted lines in Fig. 1. This movement of the lever has lifted its counter-weight G', and upon the freeing of the lever the counter-weight causes it to drop back, and in falling it acquires a considerable momentum, so that as it reaches its normal position and tautens the chain $a$ it exerts a considerable upward jerk on the siphon F. This siphon is at this time nearly all under water, the water-level having risen to the point shown in Fig. 3, so that the siphon and valve weigh less than if in air to the extent of the water they displace, according to the well-known law of hydrostatics. Their weight being thus reduced, the upward pull thus exerted by the falling back of the lever G is sufficient to lift the siphon and valve, as shown in Fig. 3. The water thereupon begins to flow out underneath the valve, as shown by the arrows, and to fall down the flushing-pipe D. In so doing it exerts a considerable suction, which quickly draws the valve and siphon back to place, and the suction being exerted through the inner tube of the siphon causes the water to ascend through the outer tube and to descend through the inner tube, as shown by the arrow in Fig. 3, thereby establishing a siphonic outflow, which will continue until the tank is emptied to the lowest level reached by the siphon. The tank will then be refilled from the faucet C and with a rapidity determined by the adjustment of this faucet, whereupon the flushing operation will be repeated, and so on indefinitely, flushes being given at regular intervals. As the water runs out of the tank the float I descends until stopped by the stop d, and in its descent the pawl K sweeps upwardly to its first position. In so doing its nose encounters the under side of the end of the lever G; but, the pawl being yielding in this direction, it tilts freely until it passes the lever G, whereupon it drops back to its normal position against the lever J.

My improved flushing-tank has the advantage of being unaffected in its operation by the pressure at which the water enters through the supply-pipe and of not being dependent for the starting of the siphon upon the mere overflow of the water from the outer into the inner tube or down-leg of the siphon, such overflow being often insufficient to start the siphonic discharge. My new tank has been found by practical use to start the siphon with regularity and certainty.

Although I have shown in the drawings a siphon outlet-valve—that is to say, a siphon carrying a valve on its long leg, so that to lift the valve it is necessary to lift the siphon bodily—yet this construction, which is in itself a well-known construction in the art, is not essential to my invention. So far as my invention is concerned, the siphon may be fixed immovably in place and the valve alone be made movable and connected by a chain, sliding rod, or other loose connection to the counterweighted lever G. Such valves for starting fixed siphons are also well known in the art.

I claim as my invention the following-defined novel features, substantially as hereinbefore specified, namely:

1. A periodical flushing-tank having an inlet-faucet, a discharge-siphon, and an outlet-valve for starting the siphon, a counterweighted lever connected to said valve, a float, and mechanism adapted by the ascent of the float to tilt said lever and lift its counterweight and comprising a trip device for freeing said lever to permit it to fall back and lift said valve, thereby permitting an outflow of water to start the siphon.

2. A periodical flushing-tank having an inlet-faucet, a discharge-siphon, and an outlet-valve for starting the siphon, a counterweighted lever connected to said valve, a float, a lever connected to said float, and a pawl carried by said lever adapted as the float ascends to engage said counterweighted lever and tilt it to lift its counter-weight and arranged to free itself therefrom when the float ascends to a certain height, thereby permitting the counterweighted lever to fall back and lift said valve, thereby causing an outflow which starts the siphon.

3. A periodical flushing-tank having an inlet-faucet, a siphon outlet-valve, a counterweighted lever connected to said siphon-valve, a float, a lever connected to said float, and a pawl carried by said lever and adapted by the ascent of the float to move downwardly and encounter and carry with it the end of the counterweighted lever and arranged to free itself therefrom and permit the counterweighted lever to fall back and lift the siphon-valve.

In witness whereof I have hereunto signed my name in the presence of two subscribing witnesses.

THOMAS C. BEAUMONT.

Witnesses:
GEORGE H. FRASER,
CHARLES K. FRASER.